US008976725B2

(12) United States Patent
Sawai

(10) Patent No.: US 8,976,725 B2
(45) Date of Patent: Mar. 10, 2015

(54) COMMUNICATION SYSTEM, RELAY DEVICE, COMMUNICATION TERMINAL, AND BASE STATION

(75) Inventor: Ryo Sawai, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 13/496,499

(22) PCT Filed: Aug. 16, 2010

(86) PCT No.: PCT/JP2010/063808
§ 371 (c)(1),
(2), (4) Date: Mar. 16, 2012

(87) PCT Pub. No.: WO2011/036965
PCT Pub. Date: Mar. 31, 2011

(65) Prior Publication Data
US 2012/0182930 A1    Jul. 19, 2012

(30) Foreign Application Priority Data

Sep. 25, 2009    (JP) ................ 2009-220483

(51) Int. Cl.
H04J 3/08    (2006.01)
H04B 7/02    (2006.01)
H04L 5/00    (2006.01)
H04B 7/155    (2006.01)
H04W 84/04    (2009.01)

(52) U.S. Cl.
CPC .............. *H04B 7/026* (2013.01); *H04L 5/0035* (2013.01); *H04B 7/155* (2013.01); *H04W 84/047* (2013.01)
USPC ........................................... 370/315

(58) Field of Classification Search
USPC .................................................. 370/252, 315
See application file for complete search history.

(56) References Cited

U.S. PATENT DOCUMENTS 7,768,985 B2 * 8/2010 Morioka et al. .............. 370/338
7,961,670 B2 * 6/2011 Park et al. ..................... 370/328
8,081,696 B2 * 12/2011 Sun et al. ...................... 375/261

(Continued)

FOREIGN PATENT DOCUMENTS

CN    100499917 C    6/2009
CN    101494899 A    7/2009

(Continued)

OTHER PUBLICATIONS

3GPP TSG RAN WG1 meeting #55b, "Considerations on LTE Relay," China Protevio, CATT, Total 12 Pages, (Jan. 11-16, 2009).
3GPP TSG-RAN WG RAN1#55bis, "Joint analog network coding and Relay," Alcatel Shanghai Bell, Alcatel-Lucent, R1-090065, Total 7 Pages, (Jan. 12-16, 2009).

(Continued)

*Primary Examiner* — Hassan Kizou
*Assistant Examiner* — Abdullahi Ahmed
(74) *Attorney, Agent, or Firm* — Oblon, McClelland, Maier & Neustadt, L.L.P.

(57) ABSTRACT

Provided is a communication system including a plurality of base stations, a plurality of communication terminals that communicates with one of the plurality of base stations, and a relay device, the relay device including a selection unit that selects a communication terminal to be relayed from among the plurality of communication terminals on the basis of communication quality information received from each of the plurality of communication terminals, and a relay unit that relays communication between the communication terminal selected by the selection unit and the corresponding base station.

20 Claims, 14 Drawing Sheets

(56) References Cited

U.S. PATENT DOCUMENTS

| | | | |
|---|---|---|---|
| 8,160,048 B2* | 4/2012 | Du et al. | 370/346 |
| 8,290,533 B2* | 10/2012 | Kojima | 455/526 |
| 8,325,655 B2* | 12/2012 | Wang et al. | 370/329 |
| 8,359,042 B2* | 1/2013 | Kim et al. | 455/452.2 |
| 8,593,932 B2* | 11/2013 | Laroia et al. | 370/203 |
| 2009/0290528 A1* | 11/2009 | Kwon et al. | 370/315 |
| 2010/0167743 A1* | 7/2010 | Palanki et al. | 455/436 |
| 2010/0261426 A1* | 10/2010 | Shin et al. | 455/9 |
| 2011/0194485 A1* | 8/2011 | Horneman et al. | 370/315 |
| 2011/0235570 A1* | 9/2011 | Seo et al. | 370/315 |
| 2012/0052796 A1* | 3/2012 | Takano | 455/7 |
| 2012/0207049 A1* | 8/2012 | Du et al. | 370/252 |
| 2013/0070628 A1* | 3/2013 | Natarajan et al. | 370/252 |
| 2013/0114478 A1* | 5/2013 | Shi et al. | 370/280 |

FOREIGN PATENT DOCUMENTS

| | | |
|---|---|---|
| JP | 2001 28566 | 1/2001 |
| WO | 2009 096187 | 8/2009 |

OTHER PUBLICATIONS

3GPP TSG RAN WG1 meeting #57, "Understanding on Type 1 and Type 2 Relay," Huawei, R1-091803, Total 4 Pages, (May 3-8, 2009).

International Search Report Issued Nov. 16, 2010 in PCT/JP10/63808 Filed Aug. 16, 2010.

U.S. Appl. No. 13/496,560, filed Mar. 16, 2012, Sawai.

Office Action issued Oct. 8, 2013 in Japanese Patent Application No. 2009-220483.

Combined Chinese Office Action and Search Report issued Jan. 8, 2014 in Patent Application No. 201080041237.4 (with English language translation).

* cited by examiner

FIG. 3
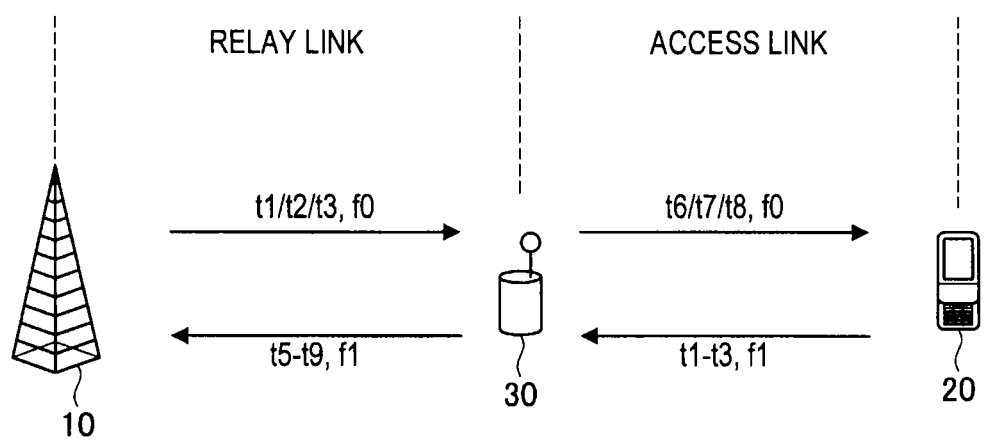
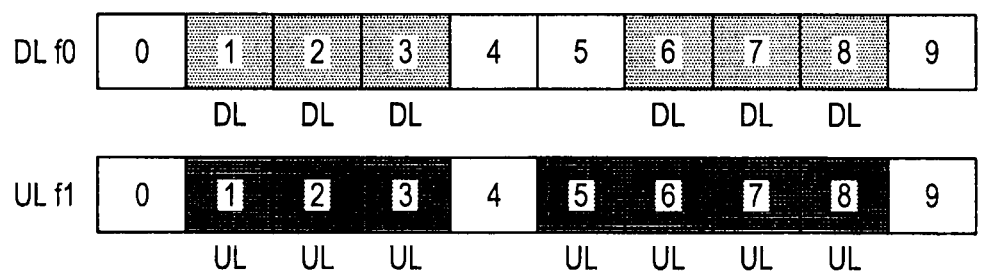

COMMUNICATION SYSTEM, RELAY DEVICE, COMMUNICATION TERMINAL, AND BASE STATION

TECHNICAL FIELD

The present invention relates to a communication system, a relay device, a communication terminal, and a base station.

BACKGROUND ART

In IEEE (Institute of Electrical and Electronics Engineers) 802.16j, a relay technology is standardized. In addition, in 3GPP (Third Generation Partnership Project) LTE-A (Long Term Evolution Advanced), a technology of using a relay device (relay station) is also actively studied in order to realize an improvement in the throughput of a communication terminal located at a cell edge.

Such a relay device, upon receiving a signal transmitted from a base station in a downlink, amplifies the signal and transmits the amplified signal to a communication terminal. By performing such relay, the relay device can increase the signal-to-noise ratio compared to when a signal is transmitted directly from the base station to the communication terminal. Likewise, in an uplink, the relay device can also maintain the high signal-to-noise ratio by relaying a signal transmitted from the communication terminal to the base station. Such a relay device is described in, for example, Non-Patent Literature 1 to 3.

CITATION LIST

Non-Patent Literature

Non-Patent Literature 1: R1-090015, "Consideration on Relay.ppt", China Potevio, CATT, January 2009
Non-Patent Literature 2: R1-090065, "Joint analog network coding and Relay", Alcatel-Lucent, January 2009
Non-Patent Literature 3: R1-091803, "Understanding on Type 1 and Type 2 Relay", Huawei, May 2009

SUMMARY OF INVENTION

Technical Problem

However, there has been no report about, when a plurality of communication terminals exists in the relayable range of a relay device, how to relay the communication of which communication terminal. Therefore, a case is supposed in which communication of a communication terminal, which should be relayed with a high degree of necessity, may not be relayed but a communication terminal, which should be relayed with a low degree of necessity, may be relayed.

The present invention has been made in view of the foregoing problems, and it is an object of the present invention to provide a communication system, a relay device, a communication terminal, and a base station that are novel and improved, and are capable of selecting a communication terminal to be relayed.

Solution to Problem

In order to solve the aforementioned problem, according to one aspect of the present invention, there is provided a communication system including a plurality of base stations, a plurality of communication terminals that communicates with one of the plurality of base stations, and a relay device, the relay device including a selection unit that selects a communication terminal to be relayed from among the plurality of communication terminals on the basis of communication quality information received from each of the plurality of communication terminals, and a relay unit that relays communication between the communication terminal selected by the selection unit and the corresponding base station.

The relay device may further include a power setting unit that sets transmission power of a relay signal for the communication terminal to be relayed so that a difference between the transmission power and a propagation loss of the relay signal between another communication terminal and the relay device is below a predetermined value.

The relay device may further include a distance estimation unit that estimates a distance between the relay device and the other communication terminal on the basis of a propagation loss of a reference signal received from the other communication terminal, the reference signal having known transmission power, and the power setting unit may estimate a propagation loss of the relay signal between the other communication terminal and the relay device on the basis of the distance estimated by the distance estimation unit.

The selection unit may preferentially select a communication terminal with bad communication quality from among the plurality of communication terminals.

The relay unit may transmit the relay signal for the communication terminal to be relayed through beam forming.

The relay device may further include a power setting unit that sets transmission power of a relay signal for a base station corresponding to the communication terminal to be relayed so that a difference between the transmission power and a propagation loss of the relay signal between another base station and the relay device is below a predetermined value.

The relay device may further include a distance estimation unit that estimates a distance between the relay device and the other base station on the basis of a propagation loss of a reference signal received from the other base station, the reference signal having known transmission power, and the power setting unit may estimate a propagation loss of the relay signal between the other base station and the relay device on the basis of the distance estimated by the distance estimation unit.

In order to solve the aforementioned problem, according to another aspect of the present invention, there is provided a relay device including a selection unit that selects a communication terminal to be relayed from among a plurality of communication terminals on the basis of communication quality information received from each of the plurality of communication terminals that communicates with one of a plurality of base stations, and a relay unit that relays communication between the communication terminal selected by the selection unit and the corresponding base station.

In order to solve the aforementioned problem, according to still another aspect of the present invention, there is provided a communication terminal, wherein when the communication terminal is selected as a communication terminal to be relayed by a relay device that selects a communication terminal to be relayed from among a plurality of communication terminals on the basis of communication quality information received from each of the plurality of communication terminals including the communication terminal that communicates with one of a plurality of base stations, the communication terminal communicates with the base station via the relay device.

In order to solve the aforementioned problem, according to yet another aspect of the present invention, there is provided a base station, wherein when a communication terminal that communicates with the base station is selected as a communication terminal to be relayed by a relay device that selects a communication terminal to be relayed from among a plurality of communication terminals on the basis of communication quality information received from each of the plurality of communication terminals that communicates with one of a plurality of base stations including the base station, the base station communicates with the communication terminal via the relay device.

Advantageous Effects of Invention

As described above, according to the present invention, a communication terminal to be relayed can be adequately selected.

BRIEF DESCRIPTION OF DRAWINGS

FIG. 3 is an explanatory diagram showing exemplary resource allocation when different frequencies are used in an UL and a DL.

DESCRIPTION OF EMBODIMENTS

Hereinafter, preferred embodiments of the present invention will be described in detail with reference to the appended drawings. Note that, in this specification and the drawings, structural elements that have substantially the same function and structure are denoted by the same reference signs, and repeated explanation is omitted.

In addition, in this specification and the drawings, a plurality of structural elements that have substantially the same function and structure and are denoted by the same reference signs may be followed by different alphabets for distinction purposes. For example, a plurality of structures that have substantially the same function and structure are distinguished as communication terminals 20A, 20B, and 20C as needed. However, when there is no need to particularly distinguish between each of the plurality of structural elements that have substantially the same function and structure, only reference signs are assigned. For example, when there is no need to particularly distinguish between the communication terminals 20A, 20B, and 20C, they are simply referred to as communication terminals 20.

The "Description of Embodiments" will be described in accordance with the following item order.

Figure 1:
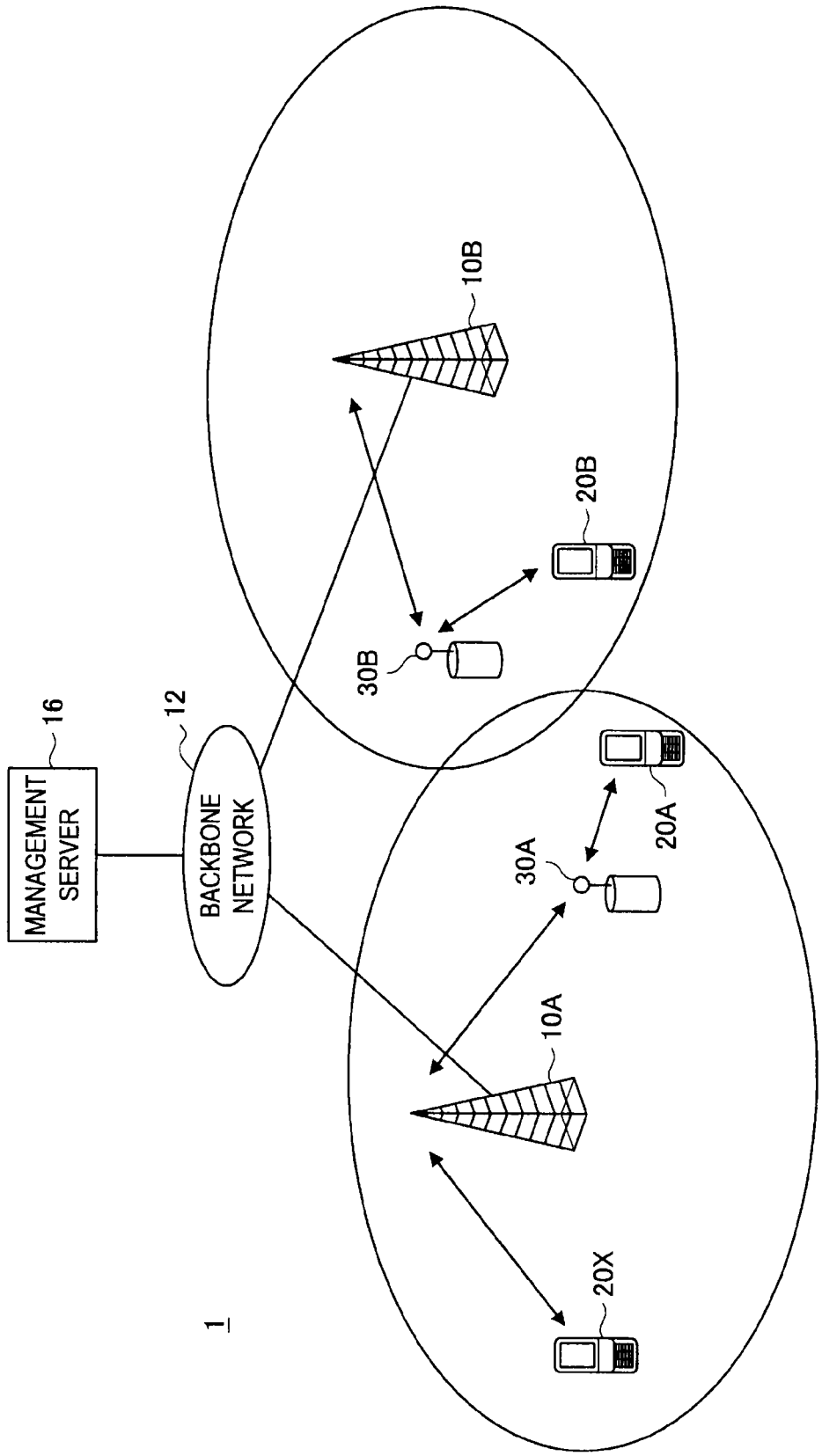
FIG. 1 is an explanatory diagram showing the configuration of a communication system in accordance with an embodiment of the present invention.

1. Basic Configuration of the Communication System
(Exemplary Resource Allocation to Each Link)
(Exemplary Format of Radio Frame)
(Connection Process Sequence)
(MBSFN)
(Exemplary Frequency Allocation to Each Cell)
2. Specific Configuration of the Communication System
(Interference Model being Focused)
(Configuration of the Communication Terminal)
(Configuration of the Relay Device)
3. Operation of Communication System
4. Conclusion 1. Basic Configuration of the Communication System First, the basic configuration of a communication system 1 in accordance with an embodiment of the present invention will be described with reference to FIGS. 1 to 8. FIG. 1 is an explanatory diagram showing the configuration of the communication system 1 in accordance with an embodiment of the present invention. As shown in FIG. 1, the communication system 1 in accordance with an embodiment of the present invention includes base stations 10A and 10B, a backbone network 12, communication terminals 20A and 20B, and 20X, and relay devices 30A and 30B.

The base station 10 manages the communication between the relay device 30 and the communication terminal 20 existing in a cell that is formed by the base station 10. For example, the base station 10A manages scheduling information for communicating with the communication terminal 20X existing in the cell, and communicates with the communication terminal 20X in accordance with the scheduling information. In addition, the base station 10A also manages scheduling information for communicating with the relay device 30A existing in the cell and scheduling information for the relay device 30A and the communication terminal 20A to communicate with each other.

Note that the management of the scheduling information can be performed by the joint cooperation of the base station 10 and the relay device 30, by the joint cooperation of the base station 10, the relay device 30, and the communication terminal 20, or by the relay device 30.

The relay device 30 relays the communication between the base station 10 and the communication terminal 20 in accordance with the scheduling information managed by the base station 10. Specifically, the relay device 30, upon receiving a signal transmitted from the base station 10 in a downlink, transmits a signal obtained by amplifying the signal to the communication terminal 20 using the frequency/time in accordance with the scheduling information. By performing such relay, the relay device 30 can increase the signal-to-noise ratio compared to when a signal is transmitted directly from the base station 10 to the communication terminal 20 located near a cell edge.

Likewise, in an uplink, the relay device 30 can also maintain the high signal-to-noise ratio by relaying a signal transmitted from the communication terminal 20 to the base station 10 in accordance with the scheduling information managed by the base station 10. Although FIG. 1 shows an example in which only the relay device 30A exists in the cell formed by the base station 10A, a plurality of relay devices 30 can exist in the cell formed by the base station 10A.

As the types of such relay device 30, Type 1 and Type 2 have been proposed. The relay device 30 of Type 1 has an individual cell ID and is permitted to operate its own cell. Thus, the relay device 30 of Type 1 operates in such a way that it is recognized as the base station 10 by the communication terminal 20. However, the relay device 30 of Type 1 operates not entirely autonomously, and performs relay communication within the range of resources that are allocated by the base station 10.

Meanwhile, the relay device 30 of Type 2 does not have an individual cell ID unlike Type 1, and assists in the direct communication between the base station 10 and the communication terminal 20. For example, relay transmission technologies using Cooperative relay and Network coding have been studied. The characteristics of Type 1 and Type 2 that are currently studied are shown in Table 1 below.

TABLE 1

| Item | Type 1 | Type 2 |
| --- | --- | --- |
| Decision | R1-091098 | R1-091632 |
| Type of Relay | L2 and L3 Relay | L2 |
| PHY Cell ID | Own cell ID | No cell ID |
| Transparency | Non transparent Relay node to UE | Transparent Relay node to UE |
| New cell | Create new cell (another eNB) | Not create new cell |
| RF parameters | Optimized parameters | N/A |
| HO | Inter cell HO (generic HO) | HO transparently to UE |
| Control Channel Generation | Generate synch. channel, RS, H-ARQ channel and scheduling information etc. | Not generate its own channel but decodes/ forwards donor eNB's signal to UE |
| Backward compatibility | Support (appear as a Rel-8 eNB to Rel-8 UE) | Support (able to relay also to/from Rel-8 UE) |
| LTE-A (Forward compatibility) | Support (it appear differently than Rel-8 eNB to LTE-A UE) | — |
| Awareness to MS | — (>Rel-8 eNB to LTE-A UEs or Relay) | — |
| Cooperation | Inter cell cooperation | Intra cell cooperation |
| Backhaul utilization | Higher | Lower |
| Usage model | Coverage extension | Throughput enhancement and coverage extension |
| Cost | Higher | Lower |

As described above, the communication terminal 20 communicates with the base station 10 either directly or via the relay device 30 in accordance with the scheduling information managed by the base station 10. Note that examples of data that are transmitted/received by the communication terminal 20 include voice data; music data such as music, lectures, or radio programs; still image data such as photographs, documents, paintings, or charts; and moving image data such as movies, television programs, video programs, or game images. The communication terminal 20 can be an information processing device having a wireless communication function such as a portable phone or a PC (Personal computer).

The management server 16 is connected to each base station 10 via the backbone network 12. The management server 16 has a function of an MME (Mobile Management Entity). In addition, the management server 16 can also have a function of a serving gateway. Further, the management server 16 receives from each base station 10 management information indicating the state of a cell formed by each base station 10, and controls communication in the cell formed by each base station 10 on the basis of the management information. Note that the function of the management server 16 can be implemented with a plurality of physically separated configurations.

(Exemplary Resource Allocation to Each Link)

Herein, resource allocation to each link will be described. Note that, hereinafter, the communication channel between the base station 10 and the relay device 30 will be referred to as a relay link, the communication channel between the relay device 30 and the communication terminal 20 will be referred to as an access link, and the direct communication channel between the base station 10 and the communication terminal 20 will be referred to as a direct link. In addition, the communication channel toward the base station 10 will be referred to as an UL (uplink), and the communication channel toward the communication terminal 20 will be referred to as a DL (downlink). Note also that communication through each link is performed on the basis of OFDMA.

The relay device 30, in order to prevent mutual interference between the relay link and the access link, separates the relay link and the access link from each other on the basis of the frequency or time. For example, the relay device 30 can separate the relay link and the access link in the same direction from each other on the basis of TDD (Time Division Duplexing) using a common frequency.

Figure 2:
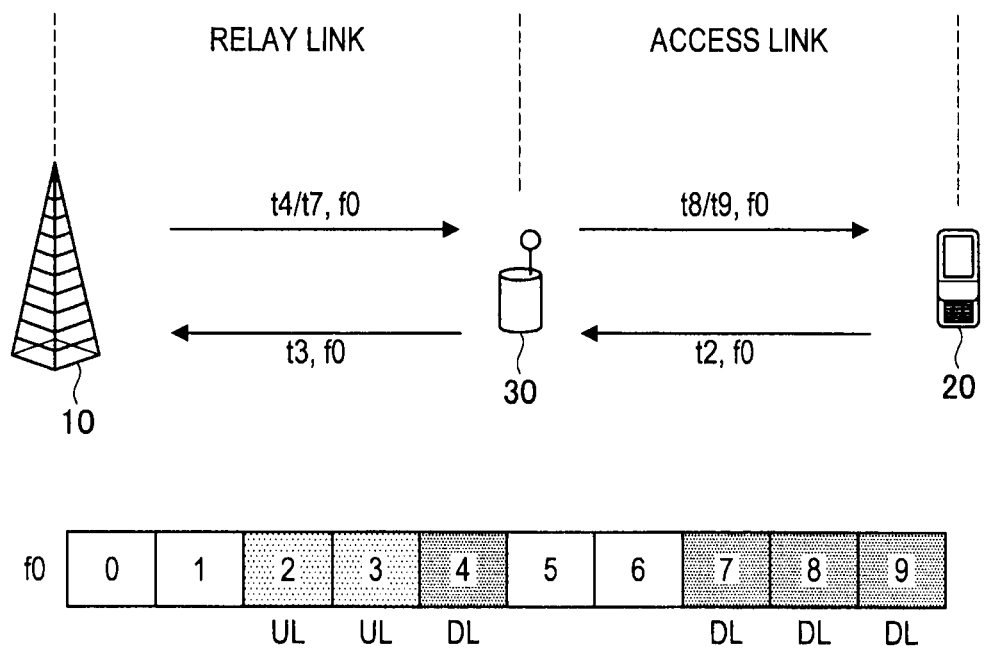
FIG. 2 is an explanatory diagram showing exemplary resource allocation when the same frequency is used in an UL and a DL.

FIG. 2 is an explanatory diagram showing exemplary resource allocation when the same frequency is used in the UL and the DL. As shown in FIG. 2, a radio frame includes a sub-frame 0 to a sub-frame 9. In the example shown in FIG. 2, the relay device 30, in accordance with an instruction from the base station 10, recognizes the sub-frames 8 and 9 as the resources for the DL of the access link, and relays a signal transmitted from the base station 10 to the communication terminal 20 using the sub-frames 8 and 9.

Note that a PSC (Primary Synchronization Channel) and a SSC (Secondary Synchronization Channel) that are synchronization signals for the downlink, and a PBCH (Physical Broadcast CHannel) are allocated to the sub-frames 0 and 5. In addition, paging channels are assigned to the sub-frames 1 and 6.

FIG. 3 is an explanatory diagram showing exemplary resource allocation when different frequencies are used in the UL and the DL. As shown in FIG. 3, a frequency f0 is used for the DL and a frequency f1 is used for the UL. In the example shown in FIG. 3, the relay device 30, in accordance with an instruction from the base station 10, recognizes sub-frames 6 to 8 of the frequency f0 as the resources for the DL of the access link, and relays a signal transmitted from the base station 10 to the communication terminal 20 using the sub-frames 6 to 8 of the frequency f0.

Note that a PSC and an SSC that are synchronization signals for the downlink are assigned to the sub-frames 0 and 5 of the frequency f0 (for the DL), and paging channels are assigned to the sub-frame 4 and the sub-frame 9.

(Exemplary Format of Radio Frame)

Next, a specific exemplary frame format of each of a DL radio frame and an UL radio frame will be described with reference to FIG. 4 and FIG. 5.

Figure 4:
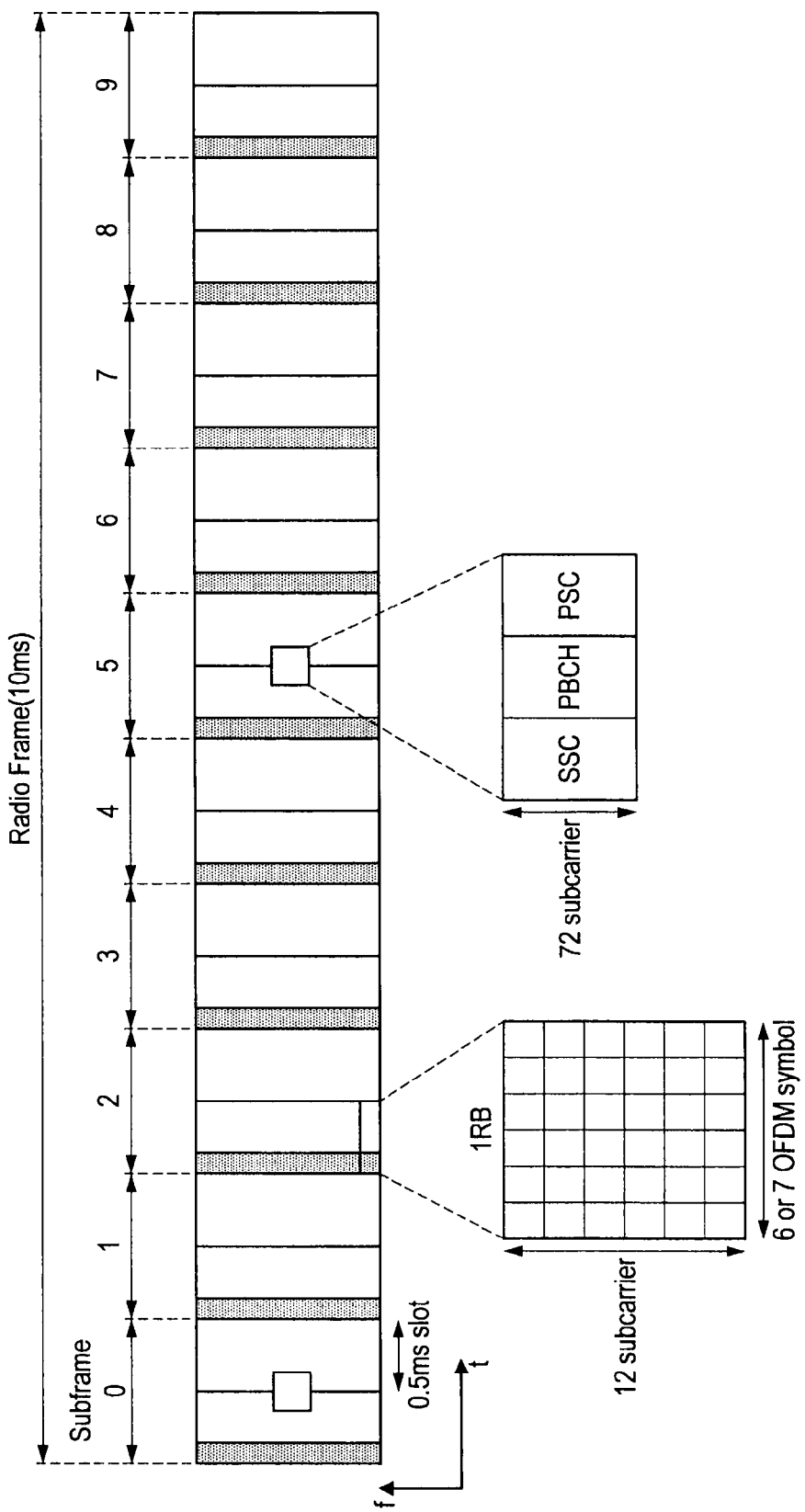
FIG. 4 is an explanatory diagram showing an exemplary format of a DL radio frame.

FIG. 4 is an explanatory diagram showing an exemplary format of a DL radio frame. The DL radio frame includes sub-frames 0 to 9, and each sub-frame includes two 0.5 ms slots. Each 0.5 ms slot includes seven OFDM (Orthogonal Frequency Division Multiplexing) symbols.

As shown in FIG. 4, in the head 1 to 3 OFDM symbols of each sub-frame, control channels such as PCFICH (Physical Control Format Indicator CHannel), PHICH (Physical Hybrid ARQ Indicator CHannel), and PDCCH (Physical Control CHannel) and arranged.

Note that each of the aforementioned channels includes the following information as an example.

PCFICH: the number of symbols of PDCCH related to Layer 1 and Layer 2

PHICH: ACK/NACK in response to PUSCH

PDCCH: downlink control information, scheduling information for PDSCH/PUSC (the format of a modulation method, encoding ratio, or the like)

In addition, one resource block (1 RB), which is the minimum unit of resource allocation, includes six or seven OFDM symbols and 12 sub-carriers as shown in FIG. 4. A demodulation reference (a reference signal) is arranged in part of the resource block.

Further, SSC, PBCH, and PSC are arranged in the sub-frames 0 and 5. Furthermore, a free portion in the radio frame shown in FIG. 4 is used as a PDSCH (Physical Downlink Shared CHannel).

Figure 5:
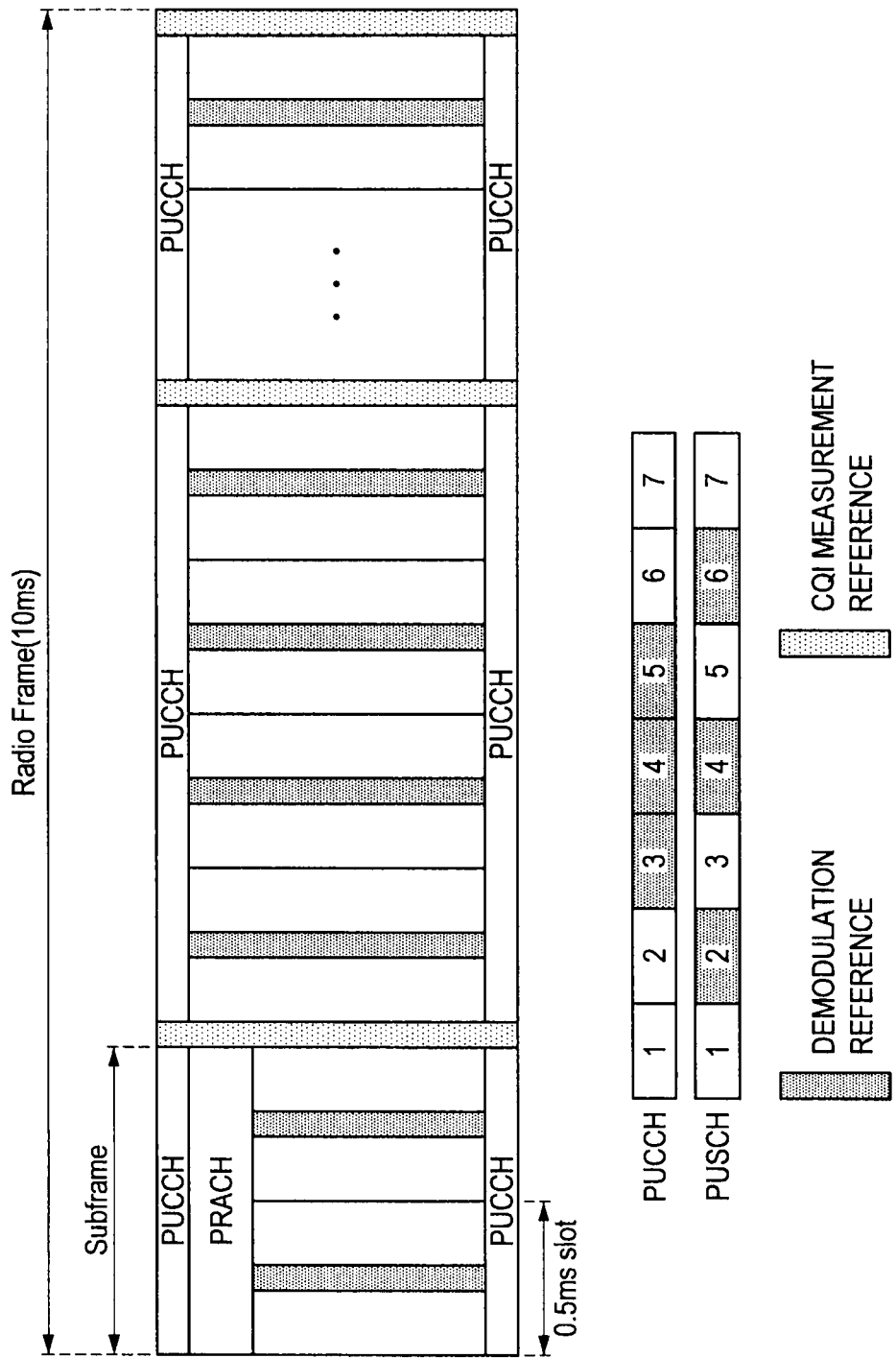
FIG. 5 is an explanatory diagram showing an exemplary format of an UL radio frame.

FIG. 5 is an explanatory diagram showing an exemplary format of the UL radio frame. Like the DL radio frame, the UL radio frame includes sub-frames 0 to 9, and each sub-frame includes two 0.5 ms slots. Each 0.5 ms slot includes seven OFDM symbols.

As shown in FIG. 5, a demodulation reference (a reference signal) is arranged in each of the 0.5 ms slots, and CQI measurement references are arranged in a dispersed manner. The base station 10 or the relay device 30 on the receiving side performs channel estimation using the demodulation reference, and demodulates a received signal in accordance with the channel estimation result. In addition, the base station 10 or the relay device 30 on the receiving side acquires CQI between the base station 10 or the relay device 30 and the relay device 30 or the communication terminal 20 on the transmitting side by measuring the CQI measurement reference.

Further, a free portion in the radio frame shown in FIG. 5 is used as a PUSCH (Physical Uplink Shared CHannel). Note that, when a CQI report is requested, the communication terminal 20 or the relay device 30 transmits the CQI report using the PUSCH.

(Connection Process Sequence)

Next, a process sequence for connecting the relay device 30 or the communication terminal 20 and the base station 10 will be described with reference to FIG. 6.

Figure 6:
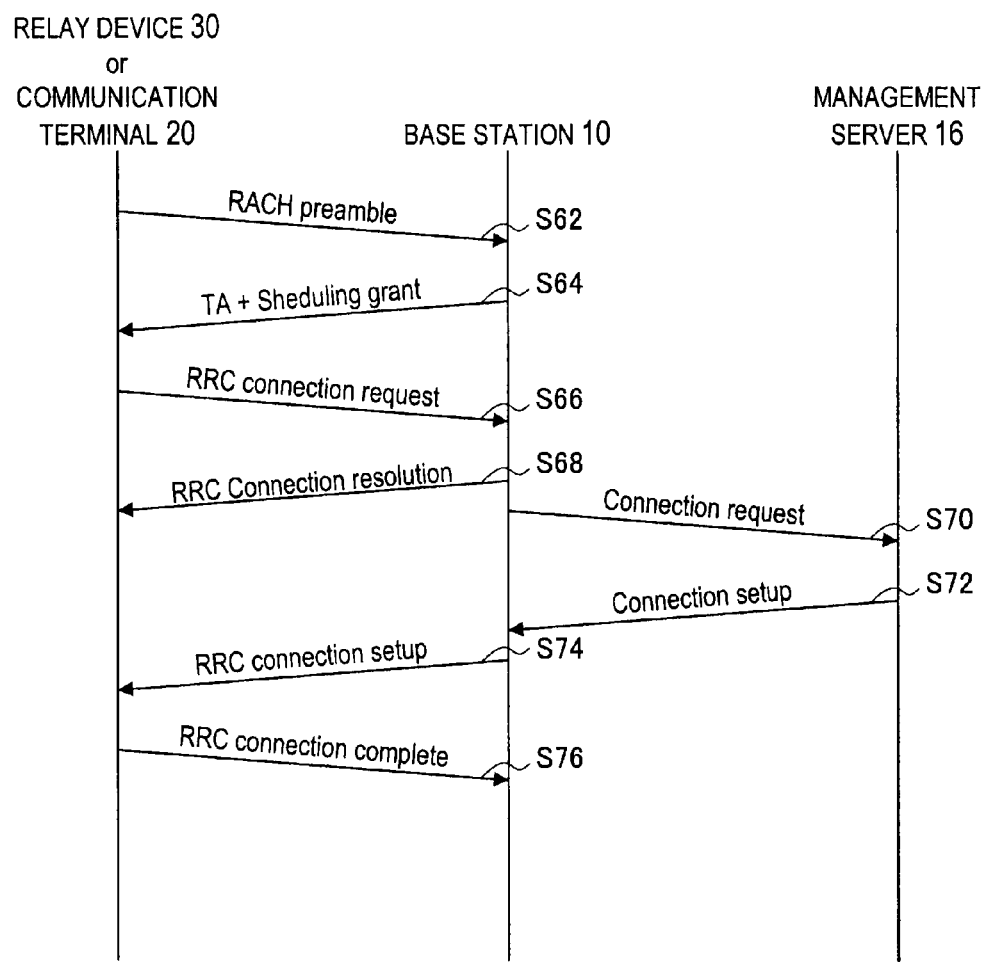
FIG. 6 is an explanatory diagram showing a connection process sequence.

FIG. 6 is an explanatory diagram showing a connection process sequence. First, as shown in FIG. 6, the relay device 30 or the communication terminal 20 transmits an RACH (Random Access CHannel) preamble to the base station 10 (S62). The base station 10, upon receiving the RACH preamble, acquires TA (Timing Advance) information, and transmits the TA information together with allocation resource information to the relay device 30 or the communication terminal 20 (S64). If the base station 10 is able to grasp the transmission timing of the RACH preamble, for example, the base station 10 can acquire as the TA information the difference between the transmission timing and the reception timing of the RACH preamble.

After that, the relay device 30 or the communication terminal 20 transmits an RRC connection request to the base station 10 using resources indicated by the allocation resource information (S66). The base station 10, upon receiving the RRC connection request, transmits an RRC connection resolution indicating the source of transmission of the RRC connection request (S68). Accordingly, the relay device 30 or the communication terminal 20 is able to check if the base station 10 has received the RRC connection request or not.

Next, the base station 10 transmits to the management server 16, which has a function of an MME, a connection request indicating that the relay device 30 or the communication terminal 20 is requesting a service (S70). The management server 16, upon receiving the connection request, transmits information for performing setup on the relay device 30 or the communication terminal 20 through connection Then, the base station 10 transmits RRC connection setup to the relay device 30 or the communication terminal 20 on the basis of the connection setup from the management server 16 (S74), whereupon the relay device 30 or the communication terminal 20 performs a connection setup. After that, the relay device 30 or the communication terminal 20 transmits to the base station 10 RRC connection complete indicating that the connection setup is complete (S76).

Accordingly, the connection between the relay device 30 or the communication terminal 20 and the base station 10 is completed, whereby they become able to communicate with each other. Note that the aforementioned connection process sequence is only exemplary, and the relay device 30 or the communication terminal 20 and the base station 10 can be connected through another sequence.

(MBSFN)

Next, MBSFN (Multi-media Broadcasting Single Frequency Network) transmission performed by the base station 10, and an exemplary operation of the relay device 30 performed in response to the MBSFN transmission will be described.

MBSFN is a mode in which a plurality of base stations 10 concurrently performs data broadcast transmission using the same frequency. Thus, according to MBSFN, the relay device 30 of Type 1, which virtually operates as a base station, transmits a control channel and the like for the DL using the same frequency as that of the base station 10. Hereinafter, a specific flow of the MBSFN transmission/reception process will be described with reference to FIG. 7.

Figure 7:
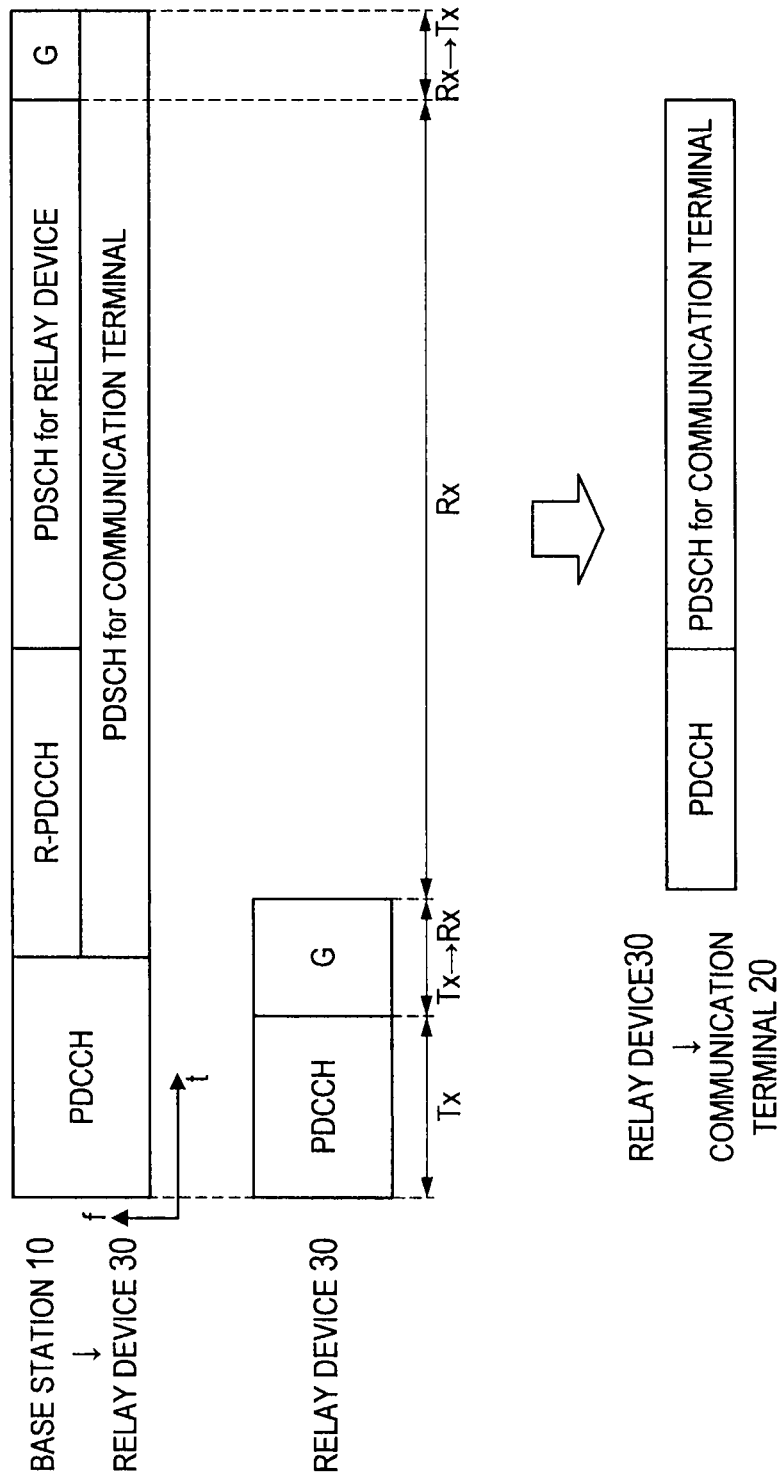
FIG. 7 is an explanatory diagram showing a specific example of a MBSFN transmission/reception process.

FIG. 7 is an explanatory diagram showing a specific example of the MBSFN transmission/reception process. First, as shown in FIG. 7, the base station 10 and the relay device 30 concurrently transmit PDCCH. Herein, following the PDCCH, the base station 10 transmits R-PDCCH for controlling the relay in addition to the PDSCH for the communication terminal 20. After the R-PDCCH, PDSCH (data to be relayed) for the relay device 30 is transmitted. Note that a non-transmission section is provided after the PDSCH for the relay device 30.

The relay device 30, after transmitting the PDCCH, undergoes a section of switching to a reception process, and receives the PDSCH (data to be relayed) from the base station 10. Then, the relay device 30 switches the reception process to a transmission process in the non-transmission section provided after the PDSCH (data to be relayed) from the base station 10. Further, the relay device 30 adds PDCCH to the decoded PDSCH (data to be relayed) in the next step, and relay-transmits it to the communication terminal 20.

Accordingly, existing communication terminals, which are not based on the presence of the relay device 30, can relish the relay by the relay device 30 without confusion.

(Exemplary Frequency Allocation to Each Cell)

Next, exemplary frequency allocation to each cell when a plurality of cells is adjacent to one another will be described.

Figure 8:
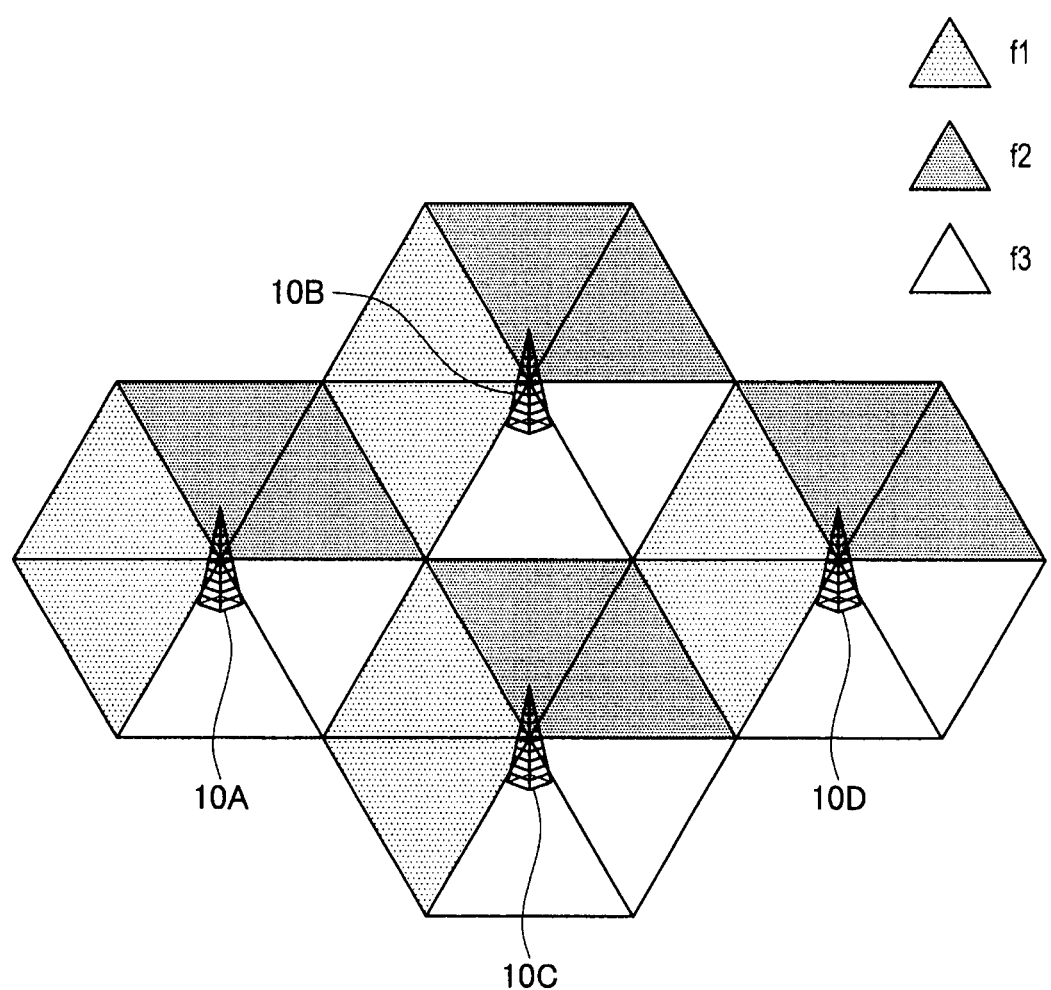
FIG. 8 is an explanatory diagram showing exemplary frequency allocation to each cell.

FIG. 8 is an explanatory diagram showing exemplary frequency allocation to each cell. When each cell includes three sectors, allocating frequencies f1 to f3 to the respective sectors as shown in FIG. 8 allows interference of the frequencies at the cell boundary to be suppressed. Such allocation is particularly effective in a densely populated area with high traffic.

Note that in LTE-A, in order to realize high end-to-end throughput, a variety of new technologies have been studied such as spectrum aggregation, network MIMO, uplink multiuser MIMO, and relay technologies. Therefore, with the advent of new mobile applications with high throughput, there is a possibility that frequency resources may become depleted even in suburban areas. Further, in the introduction of LTE-A, there is a possibility that introduction of the relay device 30 may become activated in order to realize low-cost infrastructure development.

2. Specific Configuration of the Communication System

The basic configuration of the communication system 1 in accordance with the present embodiment has been described above with reference to FIG. 1 to FIG. 8. Next, the specific configuration of the communication system 1 in accordance with the present embodiment will be described with reference to FIGS. 9 to 12.

(Interference Model being Focused)

Figure 9:
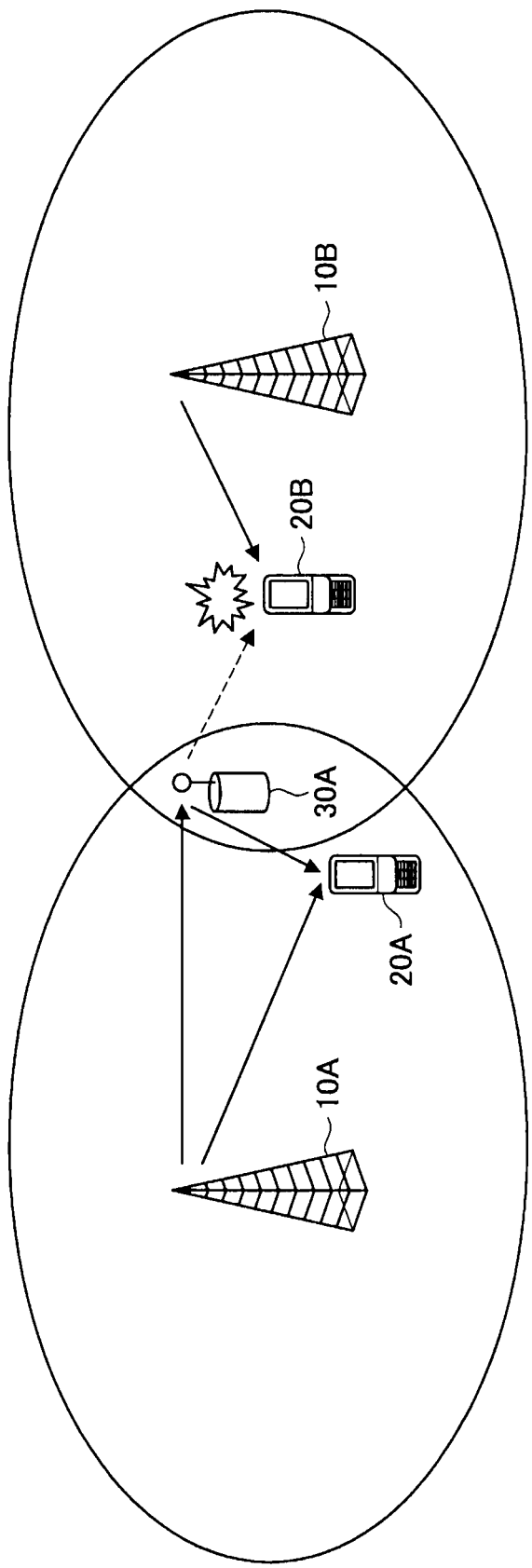
FIG. 9 is an explanatory diagram showing an interference model of a DL being focused in the present embodiment.

FIG. 9 is an explanatory diagram showing an interference model of a DL being focused in the present embodiment. In the present embodiment, as shown in FIG. 9, a case is considered in which, a relay device 30A is located at a position where the relay device 30A is able to receive PDCCH from a plurality of base stations 10 (base stations 10A and 10B), and is located at a position where the relay device 30A is able to receive signals from communication terminals 20 (communication terminals 20A and 20B) belonging the respective base stations 10.

In this case, the relay device 30A can relay both the communication between the base station 10A and the communication terminal 20A and the communication between the base station 10B and the communication terminal 20B. Herein, if the relay device 30A relays a signal transmitted from the base station 10A to the communication terminal 20A without exercising any ingenuity, it is concerned that the signal transmitted by the relay and a signal transmitted from the base station 10B may interfere with each other at the communication terminal 20B.

Figure 10:
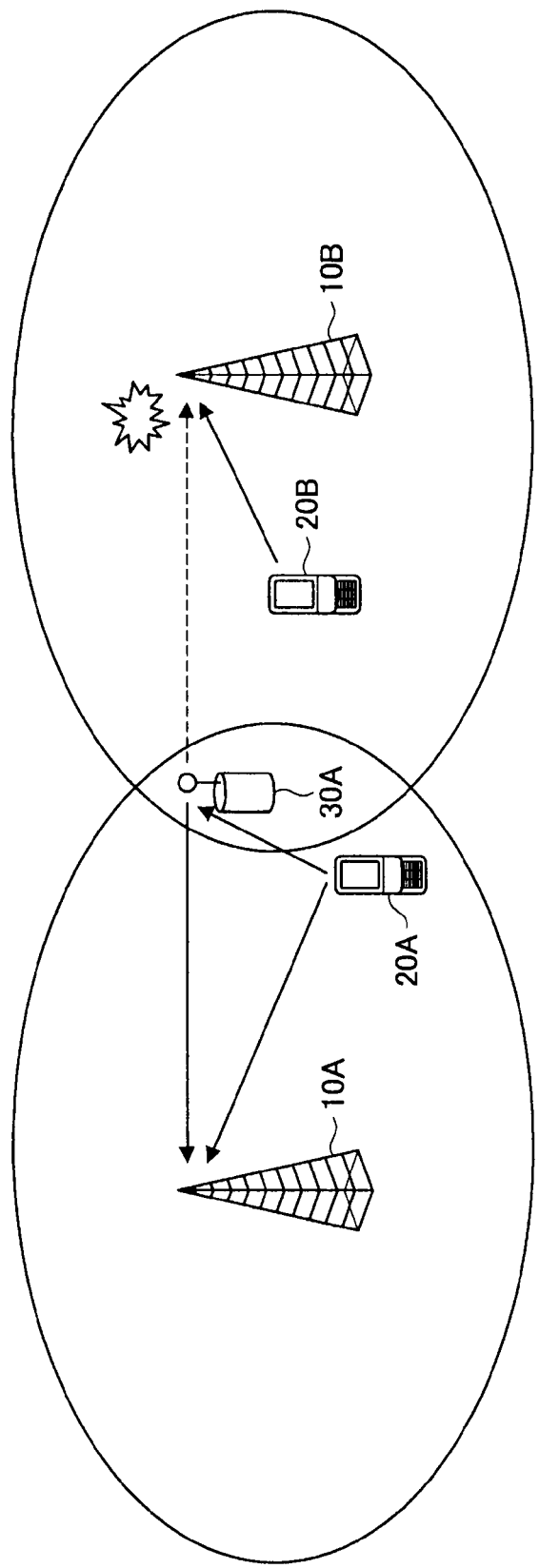
FIG. 10 is an explanatory diagram showing an interference model of an UL being focused in the present embodiment.

FIG. 10 is an explanatory diagram showing an interference model of an UL being focused in the present embodiment. In FIG. 10 a relay device 30A is located at a position where the relay device 30A is able to receive PDCCH from a plurality of base stations 10 (base stations 10A and 10B), and is located at a position where the relay device 30A is able to receive signals from communication terminals 20 (communication terminals 20A and 20B) belonging the respective base stations 10, as in FIG. 9.

In such a case, the relay device 30A can relay both the communication between the base station 10A and the communication terminal 20A and the communication between the base station 10B and the communication terminal 20B. Herein, if the relay device 30A relays a signal transmitted from the communication terminal 20A to the base station 10A without exercising any ingenuity, it is concerned that the signal transmitted by the relay and a signal transmitted from the communication terminal 20B may interfere with each other at the base station 10B.

Further, a problem of, when a plurality of communication terminals exists in the relayable range of a relay device, how to relay the communication of which communication terminal is yet to be solved. Therefore, a case is supposed in which communication of a communication terminal, which should be relayed with a high degree of necessity, may not be relayed but a communication terminal, which should be relayed with a low degree of necessity, may be relayed.

The relay device 30 in accordance with the present embodiment has been made with the aforementioned background being focused. Thus, according to the relay device 30, it is possible to adequately select communication to be relayed and suppress generation of interference due to the relay. Hereinafter, the configuration of such relay device 30 in accordance with the present embodiment will be described in conjunction with the configuration of the communication terminal 20.

(Configuration of the Communication Terminal)

Figure 11:
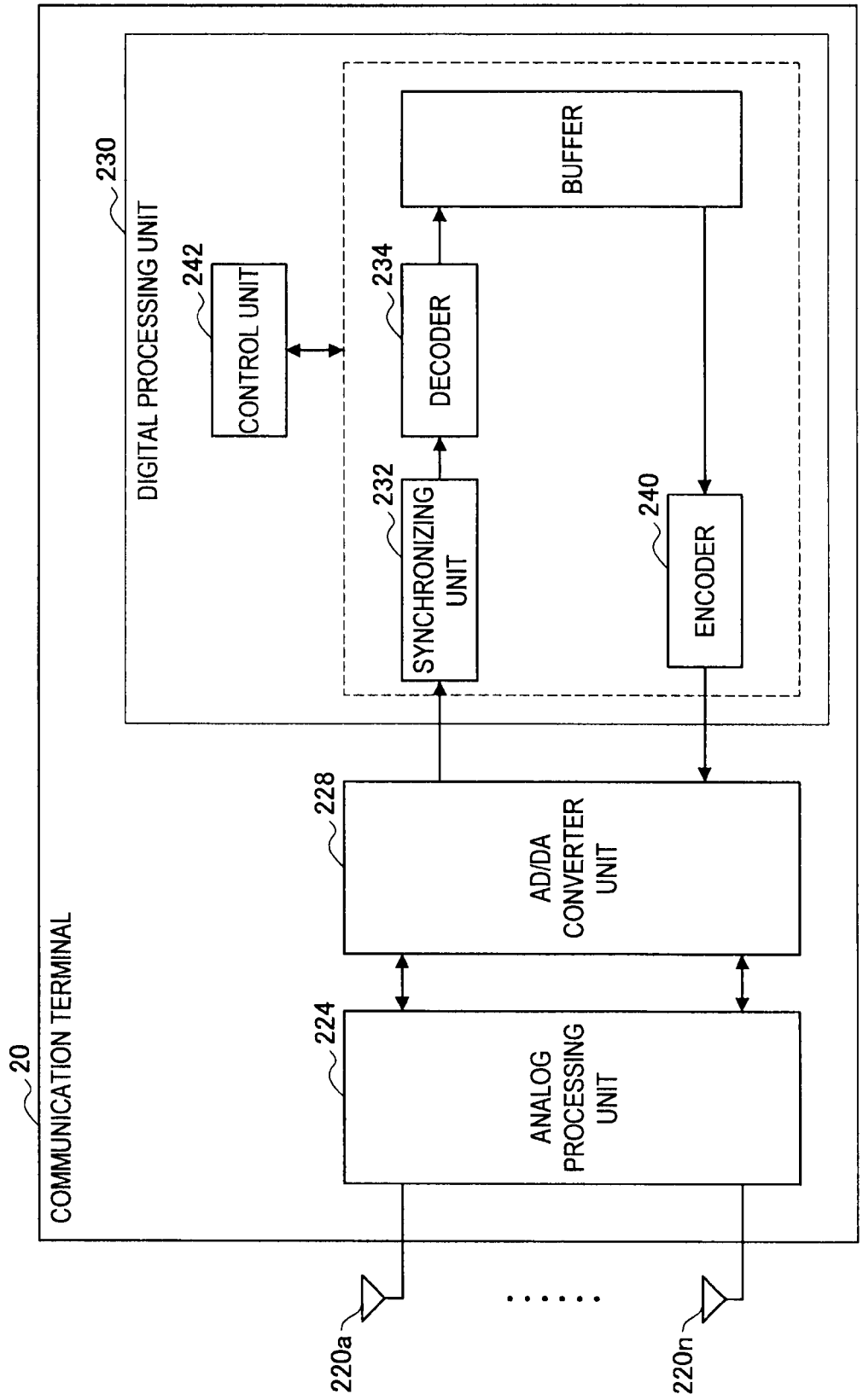
FIG. 11 is a functional diagram showing the configuration of a communication terminal.

FIG. 11 is a functional diagram showing the configuration of the communication terminal 20. As shown in FIG. 11, the communication terminal 20 includes a plurality of antennae 220a to 220n, an analog processing unit 224, an AD/DA converter unit 228, and a digital processing unit 230.

Each of the plurality of antennae 220a to 220n receives a radio signal from the base station 10 or the relay device 30 and acquires a high-frequency electrical signal, and then supplies the high-frequency signal to the analog processing unit 224. In addition, each of the plurality of antennae 220a to 220n transmits a radio signal to the base station 10 or the relay device 30 on the basis of a high-frequency signal supplied from the analog processing unit 224. As the communication terminal 20 has a plurality of antennae 220a to 220n as described above, it can perform MIMO (Multiple Input Multiple Output) communication or diversity communication.

The analog processing unit 224 converts a high-frequency signal transmitted from the plurality of antennae 220a to 220n into a baseband signal by performing analog processing such as amplification, filtering, or down conversion. In addition, the analog processing unit 224 converts a baseband signal supplied from the AD/DA converter unit 228 into a high-frequency signal.

The AD/DA converter unit 228 converts the baseband signal in an analog format supplied from the analog processing unit 224 into a digital format, and supplies it to the digital processing unit 230. In addition, the AD/DA converter unit 228 converts the baseband signal in a digital format supplied from the digital processing unit 230 into an analog format, and supplies it to the analog processing unit 224.

The digital processing unit 230 includes a synchronizing unit 232, a decoder 234, an encoder 240, and a control unit 242. Among them, the synchronizing unit 232, the decoder 234, the encoder 240, and the like function as a communication unit for communicating with the base station 10 or the relay device 30, together with the plurality of antennae 220a to 220n, the analog processing unit 224, and the AD/DA converter unit 228.

The synchronizing unit 232 is supplied with a synchronization signal such as a PSC or a SSC, which has been transmitted from the base station 10 or the relay device 30, from the AD/DA converter unit 228, and performs a synchronization process on a radio frame on the basis of the synchronization signal. Specifically, the synchronizing unit 232 computes the correlation between the synchronization signal and a known sequence pattern, and detects the peak position of the correlation, thereby synchronizing a radio frame.

The decoder 234 decodes the baseband signal supplied from the AD/DA converter unit 228 to obtain the received data. Note that the decoding can include, for example, a MIMO reception process and an OFDM demodulation process.

The encoder 240 encodes the data to be transmitted such as PUSCH, and supplies it to the AD/DA converter unit 228. Note that the encoding can include, for example, a MIMO transmission process and an OFDM modulation process.

The control unit 242 controls the entire operation in the communication terminal 20 such as a transmission process, a reception process, and a process of connecting to the relay device 30 or the base station 10. For example, the communication terminal 20, under the control of the control unit 242, performs a transmission process and a reception process using resource blocks allocated by the base station 10. Note that the control unit 242 controls a transmission process in accordance with a transmission parameter specified by the base station 10 or the relay device 30. For example, when the base station 10 has specified a TPC (Transmit Power Control) parameter for the communication terminal 20 using PDCCH, the control unit 242 controls a transmission process in accordance with the TPC parameter specified by the base station 10.

Meanwhile, when the base station 10 or the relay device 30 has requested a CQI report to the communication terminal 20 using PDCCH, the digital processing unit 230 measures the channel quality (e.g., received power) using a demodulation reference transmitted from the base station 10 or the relay device 30. The control unit 242 generates a CQI report on the basis of the aforementioned measurement result, and supplies the generated CQI report to the encoder 240. Consequently, the CQI report is transmitted to the base station 10 or the relay device 30 using PUSCH.

(Configuration of the Relay Device)

Next, the configuration of the relay device 30 will be described with reference to FIG. 12.

Figure 12:
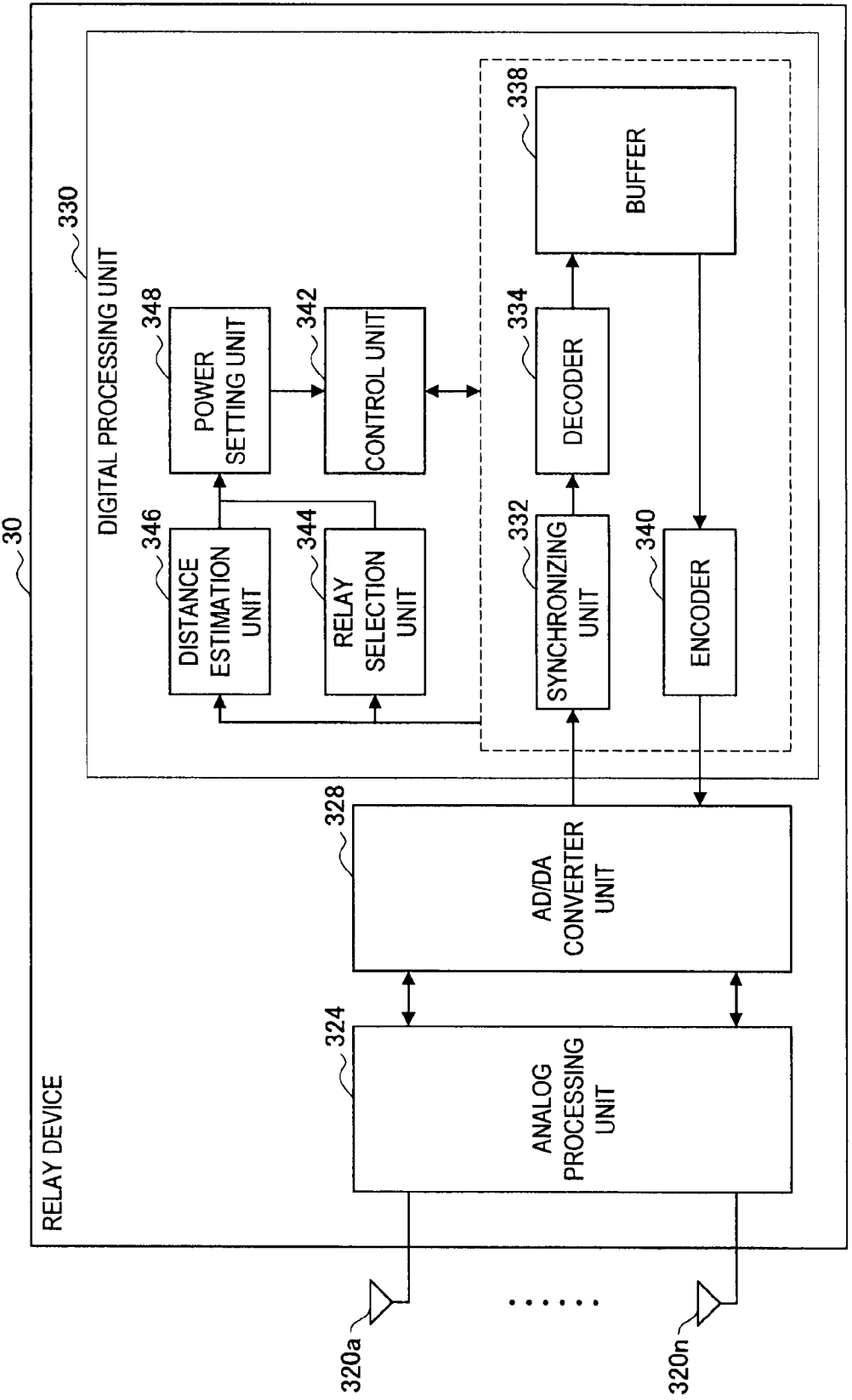
FIG. 12 is a functional diagram showing the configuration of a relay device.

FIG. 12 is a functional block diagram showing the configuration of the relay device 30. As shown in FIG. 12, the relay device 30 includes a plurality of antennae 320a to 320n, an analog processing unit 324, an AD/DA converter unit 328, and a digital processing unit 330.

Each of the plurality of antennae 320a to 320n receives a radio signal from the base station 10 or the communication terminal 20 and acquires a high-frequency electrical signal, and then supplies the high-frequency signal to the analog processing unit 324. In addition, each of the plurality of antennae 320a to 320n transmits a radio signal to the base station 10 or the communication terminal 20 on the basis of a high-frequency signal supplied from the analog processing unit 324. As the relay device 30 has a plurality of antennae 320a to 320n as described above, it can perform MIMO communication or diversity communication.

The analog processing unit 324 converts a high-frequency signal supplied from the plurality of antennae 320a to 320n into a baseband signal by performing analog processing such as amplification, filtering, or down conversion. In addition, the analog processing unit 324 converts a baseband signal supplied from the AD/DA converter unit 328 into a high-frequency signal.

The AD/DA converter unit 328 converts the baseband signal in an analog format supplied from the analog processing unit 324 into a digital format, and supplies it to the digital processing unit 330. In addition, the AD/DA converter unit 328 converts the baseband signal in a digital format supplied from the digital processing unit 330 into an analog format, and supplies it to the analog processing unit 324.

The digital processing unit 330 includes a synchronizing unit 332, a decoder 334, a buffer 338, an encoder 340, a control unit 342, a relay selection unit 344, a distance estimation unit 346, and a power setting unit 348. Among them, the synchronizing unit 332, the decoder 334, the encoder 340, and the like function as a receiving unit, a transmitting unit, and a relay unit for communicating with the base station 10 or the communication terminal 20, together with the plurality of antennae 320a to 320n, the analog processing unit 324, and the AD/DA converter unit 328.

The synchronizing unit 332 is supplied with a synchronization signal, which has been transmitted from the base station 10, from the AD/DA converter unit 328, and performs a synchronization process on a radio frame on the basis of the synchronization signal. Specifically, the synchronizing unit 332 computes the correlation between the synchronization signal and a known sequence pattern, and detects the peak position of the correlation, thereby synchronizing a radio frame.

The decoder 334 decodes the baseband signal supplied from the AD/DA converter unit 328, and obtains relay data addressed to the base station 10 or to the communication terminal 20. Note that the decoding can include, for example, a MIMO reception process, an OFDM demodulation process, and an error correction process.

The buffer 338 temporally stores the relay data addressed to the base station 10 or to the communication terminal 20 obtained by the decoder 334. Then, under the control of the control unit 342, the relay data addressed to the communication terminal 20 is read from the buffer 338 into the encoder 340 using resource blocks for the DL of the access link. Likewise, under the control of the control unit 342, the relay data addressed to the base station 10 is read from the buffer 338 into the encoder 340 using resource block for the UL of the relay link.

The encoder 340 encodes the relay data supplied from the buffer 338, and supplies it to the AD/DA converter unit 328. Note that the encoding can include, for example, a MIMO transmission process and OFDM modulation process.

(Relay Selection)

The relay selection unit 344, when the relay device 30 is located at a position where the relay device 30 is able to relay a plurality of communications, selects any of or all of the communications as the communication to be relayed. For example, the relay selection unit 344 of the relay device 30A shown in FIG. 9 selects which of the communication between the base station 10A and the communication terminal 20A and the communication between the base station 10B and the communication terminal 20B is to be relayed. Hereinafter, the criteria of selection by the relay selection unit 344 will be specifically described.

As the relay device 30A is able to receive PDCCH from both the base stations 10A and 10B, the relay selection unit 344 acquires scheduling information for an UL toward each base station 10 from the PDCCH. In addition, as the relay device 30A is able to receive PUSCH from both the communication terminals 20A and 20B, the relay selection unit 344 acquires a CQI report from the PUSCH. Note that the relay selection unit 344 can determine from which of the communication terminals 20 each PUSCH has been transmitted on the basis of the scheduling information for the UL.

Then, the relay selection unit 344 selects the communication to be relayed on the basis of the acquired CQI report (communication quality information). Herein, it is considered that relaying the communication between the base station 10 and the communication terminal 20 would be of greater significance as the communication quality of the direct link between the base station 10 and the communication terminal 20 is worse. Therefore, the relay selection unit 344 can preferentially select the communication of the direct link with worse communication quality in each of the UL and the DL.

(Case of DL Communication)

For example, in the example shown in FIG. 9, when the communication quality indicated by the CQI report transmitted from the communication terminal 20A is worse than the communication quality indicated by the CQI report transmitted from the communication terminal 20B, the relay selection unit 344 can select the DL communication in the direction from the base station 10A to the communication terminal 20A. That is, the relay selection unit 344 can select the DL communication in the direction from the base station 10A to the communication terminal 20A as the target to be relayed when "CQI_level_communication terminal 20A<CQI_level_communication terminal 20B."

(Case of UL Communication)

Similarly, in the example shown in FIG. 10, when the communication quality indicated by the CQI report transmitted from the communication terminal 20A is worse than the communication quality indicated by the CQI report transmitted from the communication terminal 20B, the relay selection unit 344 can select the UL communication in the direction from the communication terminal 20A to the base station 10A. That is, the relay selection unit 344 can select the UL communication in the direction from the communication terminal 20A to the base station 10A as the target to be relayed when "CQI_level_communication terminal 20A<CQI_level_terminal 20B."

Although the description has been made above of an example in which the relay selection unit 344 determines the communication with bad communication quality on the basis of the CQI report, the present embodiment is not limited thereto. For example, as a TPC parameter specified by the base station 10 for the communication terminal 20 changes in accordance with the state of the direct link between the base station 10 and the communication terminal 20, the TPC parameter can also be recognized as an index indicating the communication quality of the direct link. Thus, the relay selection unit 344 can preferentially select communication, which is specifically performed with a high output signal, as the target to be relayed on the basis of the TPC parameter specified through PDCCH by the base station 10 for the communication terminal 20.

(Distance Estimation)

The distance estimation unit 346 estimates the distance from each base station 10 and the distance from each communication terminal 20 located in the range in which communication is possible. For example, the distance estimation unit 346 of the relay device 30A shown in FIG. 9 estimates the distance from the base station 10A, the distance from the base station 10B, the distance from the communication terminal 20A, and the distance from the communication terminal 20B.

Specifically, the distance estimation unit 346 estimates the distance on the basis of a propagation loss of a reference signal whose transmission power and phase are known, transmitted from each base station 10 and each communication terminal 20. For example, the distance estimation unit 346 can calculate a propagation loss of a reference signal (demodulation reference) transmitted from the communication terminal 20A and estimate the distance from the communication terminal 20A on the basis of the calculated propagation loss. Similarly, the distance estimation unit 346 can calculate a propagation loss of a reference signal transmitted from the base station 10B and estimate the distance from the base station 10B on the basis of the calculated propagation loss.

(Transmission Power Setting)

The power setting unit 348 sets transmission power for performing the relay selected by the relay selection unit 344. Hereinafter, transmission power set by the power setting unit 348 in each of a case in which the target to be relayed is the DL communication and a case in which the target to be relayed is the UL communication will be described.

(Case of DL Communication)

In the example shown in FIG. 9, when the relay selection unit 344 has selected the DL communication in the direction from the base station 10A to the communication terminal 20A as the target to be relayed, a signal transmitted for relay from the relay device 30A to the communication terminal 20A is received by the communication terminal 20B as noise components. Further, if the noise components exceed the permissible interference level of the communication terminal 20B, there is a possibility that interference may be generated. Therefore, the power setting unit 348 sets the transmission power of a signal for the communication terminal 20A so that interference would not be generated at the communication terminal 20B. Specifically, the power setting unit 348 can set the transmission power so that Qos expected by the base station 10A/communication terminal 20A is satisfied and also Formula 1 below is satisfied.

[Math. 1]

$$\text{Transmission power [dB]} < \text{permissible interference level of the communication terminal } 20B \text{ [dB]} + \text{propagation loss between the relay device } 30A \text{ and the communication terminal } 20B \text{ [dB]} \quad \text{(Formula 1)}$$

In Formula 1 above, the permissible interference level of the communication terminal 20B can be the SINR required at the minimum rate of the communication terminal 20B indicated by device authentication institutions. Further, the power setting unit 348 can estimate a propagation loss between the relay device 30A and the communication terminal 20B on the basis of the distance between the relay device 30A and the communication terminal 20B estimated by the distance estimation unit 346. Note that the power setting unit 348 can set the minimum transmission power within the range that Qos expected by the base station 10A/communication terminal 20A is satisfied and also Formula 1 above is satisfied, in view of reducing the power consumption.

When the transmission power that satisfies Formula 1 above is absent, the relay device 30 need not perform the relay. Alternatively, when the relay device 30 is authorized to schedule resources, it can reallocate the resource blocks so that interference will not be generated.

(Case of UL Communication)

In the example shown in FIG. 10, when the relay selection unit 344 has selected the UL communication in the direction from the communication terminal 20A to the base station 10A as the target to be relayed, a signal transmitted for rely from the relay device 30A to the base station 10A is received by the base station 10B as noise components. Further, if the noise components exceed the permissible interference level of the base station 10B, there is a possibility that interference may be generated. Therefore, the power setting unit 348 sets the transmission power of a signal for the base station 10A so that interference would not be generated at the base station 10B. Specifically, the power setting unit 348 can set the transmission power so that Qos expected by the base station 10A/communication terminal 20A is satisfied and also Formula 2 below is satisfied.

[Math. 2]

$$\text{Transmission power [dB]} < \text{permissible interference level of the base station } 10B \text{ [dB]} + \text{propagation loss between the relay device } 30A \text{ and the base station } 10B \text{ [dB]} \quad \text{(Formula 2)}$$

In Formula 2 above, the permissible interference level of the base station 10B can be the SINR required at the minimum rate of the base station 10B indicated by device authentication institutions. Further, the power setting unit 348 can estimate a propagation loss between the relay device 30A and the base station 10B on the basis of the distance between the relay device 30A and the base station 10B estimated by the distance estimation unit 346. Note that the power setting unit 348 can set the minimum transmission power within the range that Qos expected by the base station 10A/communication terminal 20A is satisfied and also Formula 2 above is satisfied, in view of reducing the power consumption.

When the transmission power that satisfies Formula 2 above is absent, the relay device 30 need not perform the relay. Alternatively, when the relay device 30 is authorized to schedule resources, it can reallocate the resource blocks so that interference will not be generated.

(Control Unit)

The control unit 342 controls the transmission process so that a signal for relay is transmitted to the base station 10 or the communication terminal 20 selected by the relay selection unit 344 using the transmission power set by the power setting unit 348. Further, the control unit 342 can, in controlling the transmission process, control a transmission parameter such as an AMC (Advanced Modulation and Coding) parameter or a HARQ (Hybrid Automatic Repeat Request) parameter in a manner described below. Note that the control below can be performed either alone or in combination.

(Case of DL Communication)

AMC

When the communication terminal 20, which is the relay destination, and the relay device 30 have a positional relationship in which the reception level for a signal from the relay device 30 is sufficiently higher than the reception level at the communication terminal 20 from the direct link with high possibility and retransmission packets are repeatedly transmitted through the direct link, the control unit 342 can perform overlay transmission of a relay signal using a Modulation-Coding parameter with a higher rate than that of the direct link. In such a case, the signal transmitted through the direct link is buried when received by the communication terminal 20, but it is expected that the relay signal from the relay device 30 be decoded by the communication terminal 20. Note that the relay device 30 can also transmit a relay signal using a Modulation-Coding parameter with a higher rate than that of the direct link, utilizing available time slots.

HARQ

When retransmission packets are repeatedly transmitted through the direct link between the base station 10 and the communication terminal 20, the control unit 342 can perform overlay transmission of a relay signal using the same parameter as that of the retransmission packets. Note that the relay device 30 can also transmit a relay signal as a HARQ packet at a higher rate than that of the direct link utilizing available time slots.

Beam Forming

When the control unit 342 can estimate the relative direction of the communication terminal 20, which is the relay destination, the control unit 342 can transmit a relay signal through beam forming. In such a case, the power setting unit 348 can set the transmission power on the basis of the transmission power and propagation loss of a Null beam for a communication terminal 20 that is not the relay destination. According to such beam forming, it becomes possible to select a plurality of communication terminals 20 as the relay destinations and concurrently transmit relay signals to the plurality of communication terminals 20.

(Case of UL Communication)

AMC

When the base station 10, which is the relay destination, and the relay device 30 have a positional relationship in which the reception level for a signal from the relay device 30 is sufficiently higher than the reception level at the base station 10 from the direct link with high possibility and retransmission packets are repeatedly transmitted through the direct link, the control unit 342 can perform overlay transmission of a relay signal using a Modulation-Coding parameter with a higher rate than that of the direct link. In such a case, the signal transmitted through the direct link is buried when received by the base station 10, but it is expected that the relay signal from the relay device 30 be decoded by the base station 10. Note that the relay device 30 can also transmit a relay signal using a Modulation-Coding parameter with a higher rate than that of the direct link, utilizing available time slots.

HARQ

When retransmission packets are repeatedly transmitted through the direct link between the base station 10 and the communication terminal 20, the control unit 342 can perform overlay transmission of a relay signal using the same parameter as that of the retransmission packets. Note that the relay device 30 can also transmit a relay signal as a HARQ packet at a higher rate than that of the direct link utilizing available time slots.

Beam Forming

When the control unit 342 can estimate the relative direction of the base station 10, which is the relay destination, the control unit 342 can transmit a relay signal through beam forming. In such a case, the power setting unit 348 can set the transmission power on the basis of the transmission power and propagation loss of a Null beam for a base station 10 that is not the relay destination. According to such beam forming, it becomes possible to select a plurality of base stations 10 as the relay destinations and concurrently transmit relay signals to the plurality of base stations 10.

3. Operation of Communication System

The specific configuration of the communication system 1 in accordance with the present embodiment has been described above with reference to FIG. 9 to FIG. 12. Next, the operation of the communication system 1 in accordance with the present embodiment will be described with reference to FIG. 13 and FIG. 14. Note that the present embodiment is based on the following points.

- The relay device 30 uses a direct link, and has terminated the procedures of up to "RRC connection complete" in accordance with similar procedures to those of the communication terminal 20, and has also determined the sub-cell ID, reference pattern allocation, and the like.
- The base station 10 and the relay device 30 belonging thereto are synchronized.
- Grouping information that indicates the relay device 30 and the communication terminal 20 belonging to the relay device 30 is given by the base station 10 in advance (the base station 10 determines the necessity of relay from a CQI report or TA information, and allocates resources for relay if necessary).
- $Ptx\_DL \gg Ptx\_RL$ and $Ptx\_DL \gg Ptx\_AL$ (Ptx: the maximum transmission power), DL: direct link (direct link between the base station 10 and the communication terminal 20), AL: access link, and RL: relay link
- The primary object to be achieved is to take measures against interference to the direct link, in particular, interference to the direct link of the communication device (LTE UE) that is not based on the presence of the relay device 30.

(Case of DL Communication)

Figure 13:
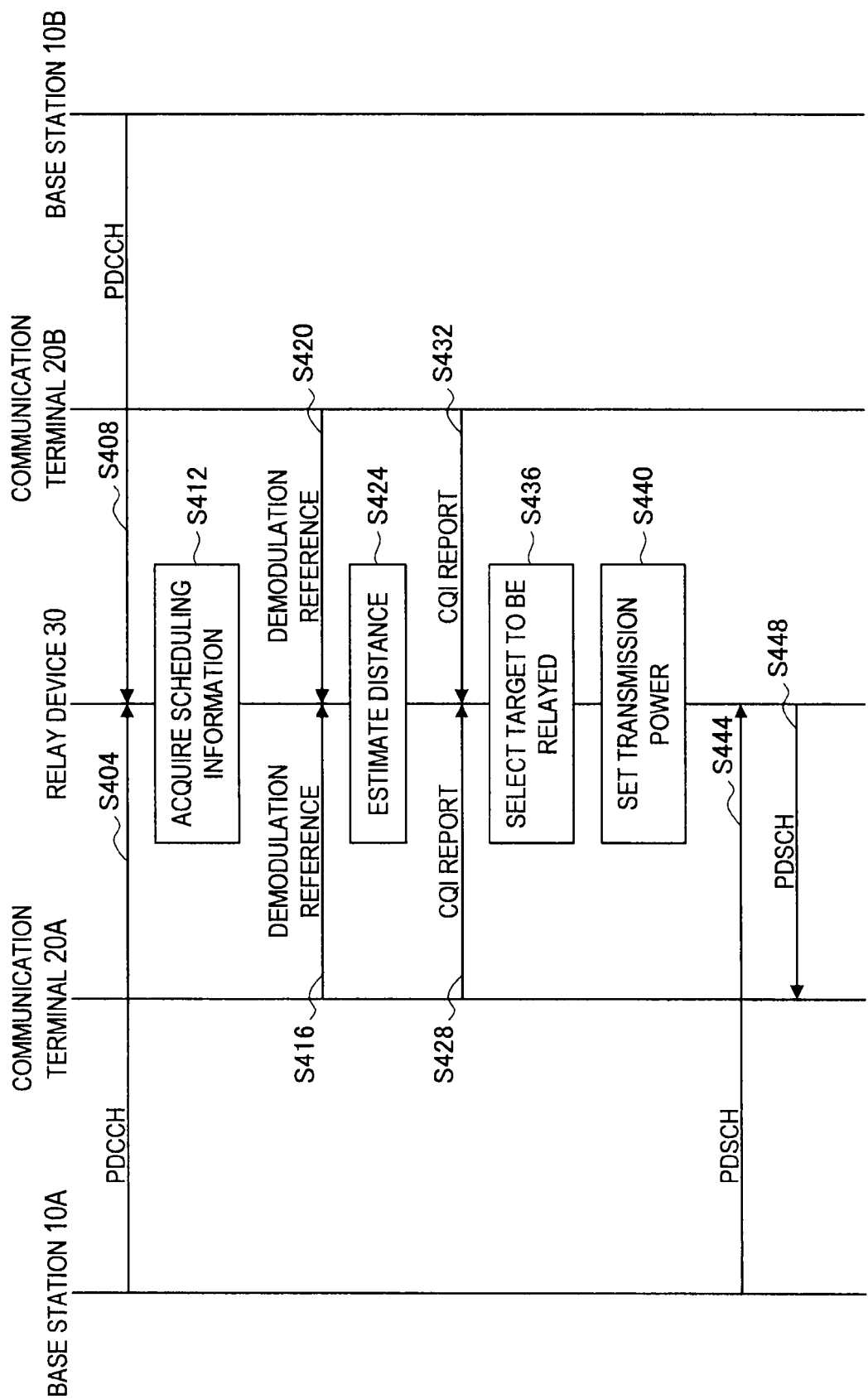
FIG. 13 is a sequence diagram showing a flow in which the relay device relays the DL communication.

FIG. 13 is a sequence diagram showing a flow in which the relay device 30 relays the DL communication. As shown in FIG. 13, the relay device 30, upon receiving PDCCH from the base station 10A (S404) and receiving PDCCH from the base station 10B (S408), acquires scheduling information from each PDCCH (S412).

Next, the relay device 30, upon receiving a demodulation reference from the communication terminal 20A (S416) and receiving a demodulation reference from the communication terminal 20B (S420), estimates the distance from the communication terminal 20A and the distance from the communication terminal 20B on the basis of a propagation loss of each demodulation reference (S424). Note that it is possible to determine from which communication terminal 20 each demodulation reference has been transmitted on the basis of the scheduling information acquired in S412.

Further, when a CQI report is received from the communication terminal 20A (S428) and a CQI report is received from the communication terminal 20B (S432), the relay selection unit 344 selects which of the communication directed to the communication terminal 20A and the communication directed to the communication terminal 20B is to be relayed on the basis of the communication quality indicated by the CQI report (S436). For example, the relay selection unit 344 can preferentially select communication with bad communication quality.

After that, the power setting unit 348 sets the transmission power of a signal for the communication terminal 20 selected in S436 so that the reception level at the other communication terminal 20 becomes less than or equal to the permissible interference level of the other communication terminal 20 (S440). Then, when the communication terminal 20A is selected in S436, the relay device 30, upon receiving PDSCH from the base station 10A (S444), transmits the received PDSCH to the communication terminal 20A using the transmission power set by the power setting unit 348 (S448). Note that the relay device 30 can transmit the PDSCH to the communication terminal 20A by adequately controlling a parameter such as AMC or HARQ.

(Case of UL Communication)

Figure 14:
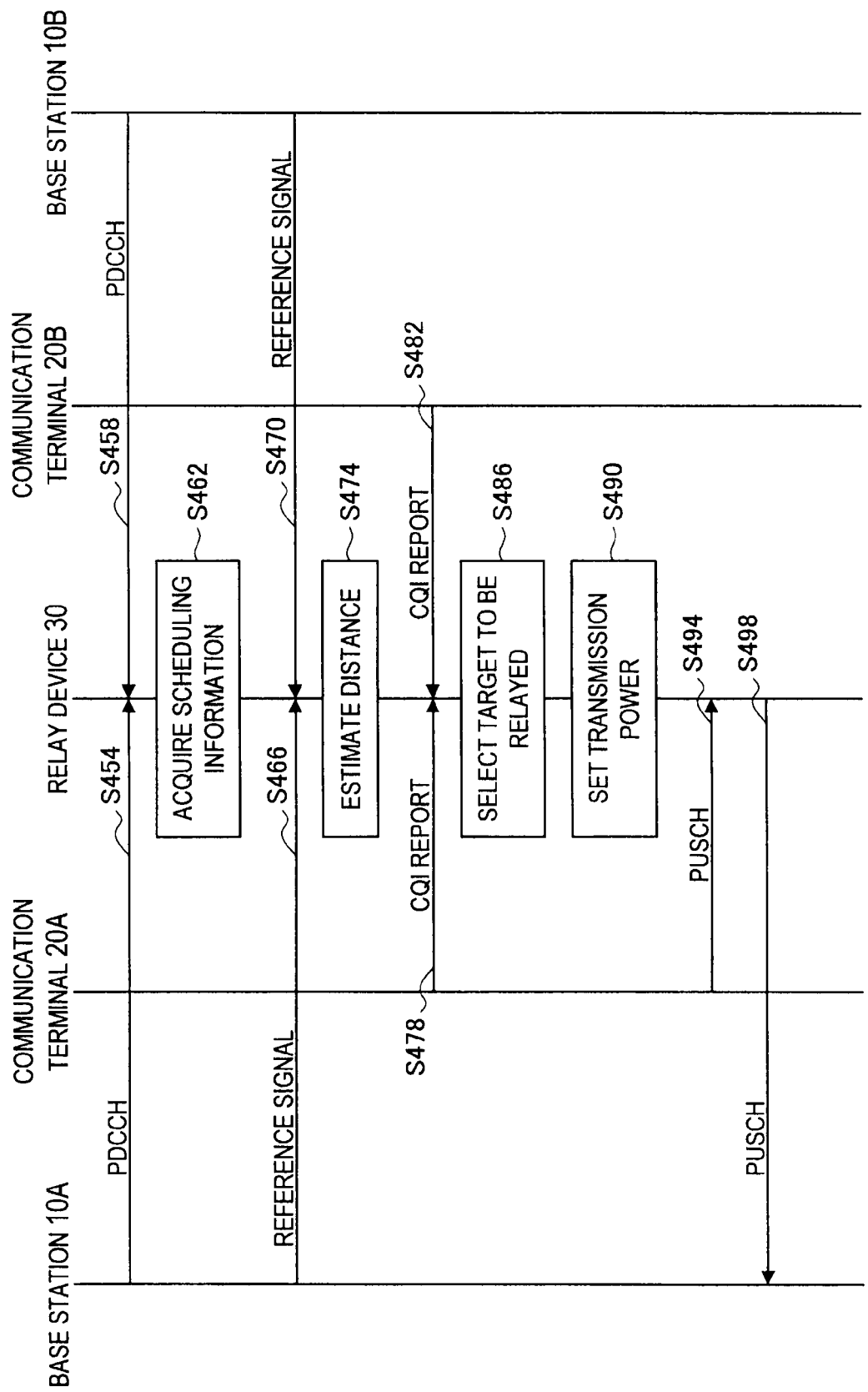
FIG. 14 is a sequence diagram showing a flow in which the relay device relays the UL communication.

FIG. 14 is a sequence diagram showing a flow in which the relay device 30 relays the UL communication. As shown in FIG. 14, the relay device 30, upon receiving PDCCH from the base station 10A (S454) and receiving PDCCH from the base station 10B (S458), acquires scheduling information from each PDCCH (S462).

Next, the relay device 30, upon receiving a reference signal from the base station 10A (S466) and receiving a reference signal from the base station 10B (S470), estimates the distance from the base station 10A and the distance from the base station 10B on the basis of a propagation loss of each reference signal (S474).

Further, when a CQI report is received from the communication terminal 20A (S478) and a CQI report is received from the communication terminal 20B (S482), the relay selection unit 344 selects which of the communication directed to the base station 10A and the communication directed to the base station 10B is to be relayed on the basis of the communication quality indicated by the CQI report (S486). For example, the relay selection unit 344 can preferentially select communication with bad communication quality.

After that, the power setting unit 348 sets the transmission power of a signal for the base station 10 selected in S486 so that the reception level at the other base station 10 becomes less than or equal to the permissible interference level of the other base station 10 (S490). Then, when the base station 10A is selected in S486, the relay device 30, upon receiving PUSCH from the communication terminal 20A (S494), transmits the received PUSCH to the base station 10A using the transmission power set by the power setting unit 348 (S498). Note that the relay device 30 can transmit the PDSCH to the communication terminal 20A by adequately controlling a parameter such as AMC or HARQ.

4. Conclusion

As described above, the relay device 30 in accordance with the present embodiment can, when a plurality of base stations 10 and communication terminals 20 exist in the range in which communication is possible, adequately select the communication to be relayed. Further, the relay device 30 in accordance with the present embodiment can transmit a relay signal using transmission power that would not cause interference at a base station 10 or a communication terminal 20 that is not the relay destination.

Although the preferred embodiments of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

For example, the steps in the process of the communication system 1 in this specification need not necessarily be processed in a time-series order in accordance with the order described in the sequence diagram. The steps in the process of the communication system 1 can be performed in an order different from that described in the sequence diagram, or be processed in parallel. For example, S404 and S408 in FIG. 13 can be concurrently received by the relay device 30 or one of them can be received earlier. The same is true for S416 and S420 and S428 and S432. Further, for example, the same is also true for S454 and S458, S466 and S470, and S478 and S482 in FIG. 14.

It is also possible to create a computer program for causing built-in hardware in the relay device 30, such as a CPU, ROM, and RAM, to exert a function that is equivalent to each of the aforementioned configurations of the relay device 30. In addition, a storage medium having the computer program stored therein is also provided.

The invention claimed is:
1. A communication system comprising:
a plurality of base stations;
a plurality of communication terminals that each communicate with one of the plurality of base stations; and
a relay device, the relay device including a circuit configured to:
select a communication terminal to be relayed from among the plurality of communication terminals on the basis of communication quality information received from each of the plurality of communication terminals,
relay communication between the communication terminal selected and the corresponding base station, and set a transmission power of a relay signal for the communication terminal to be relayed so that a difference between the transmission power and a propagation loss of the relay signal between another communication terminal and the circuit is below a predetermined value.

2. The communication system according to claim 1, wherein the circuit is further configured to:
estimate a distance between the circuit and the other communication terminal on the basis of a propagation loss of a reference signal received from the other communication terminal, the reference signal having known transmission power; and
estimate a propagation loss of the relay signal between the other communication terminal and the circuit on the basis of the estimated distance.

3. The communication system according to claim 2, wherein the circuit is further configured to select a communication terminal with bad communication quality from among the plurality of communication terminals.

4. The communication system according to claim 3, wherein the circuit is further configured to transmit the relay signal for the communication terminal to be relayed through beam forming.

5. A communication system comprising:
a plurality of base stations;
a plurality of communication terminals that each communicate with one of the plurality of base stations; and
a relay device, the relay device including a circuit configured to:
select a communication terminal to be relayed from among the plurality of communication terminals on the basis of communication quality information received from each of the plurality of communication terminals,
relay communication between the communication terminal selected and the corresponding base station, and
set a transmission power of a relay signal for a base station corresponding to the communication terminal to be relayed so that a difference between the transmission power and a propagation loss of the relay signal between another base station and the circuit is below a predetermined value.

6. The communication system according to claim 5, wherein the circuit is further configured to:
estimate a distance between the circuit and the other base station on the basis of a propagation loss of a reference signal received from the other base station, the reference signal having known transmission power, and
estimate a propagation loss of the relay signal between the other base station and the circuit on the basis of the estimated distance.

7. A relay device comprising:
a plurality of antennas; and
a processor configured to
select a communication terminal to be relayed from among a plurality of communication terminals on the basis of communication quality information received from each of the plurality of communication terminals that each communicate with one of a plurality of base stations;
control the antennas to relay communication between the selected communication terminal and the corresponding base station; and
set a transmission power of a relay signal for the communication terminal to be relayed so that a difference between the transmission power and a propagation loss of the relay signal between another communication terminal and the relay device is below a predetermined value.

8. A communication terminal, comprising:
a plurality of antennas; and
a processor configured to control the antennas to communicate with a base station of a plurality of base stations via a relay device when the communication terminal is selected by the relay device as the communication terminal to be relayed from among a plurality of communication terminals on the basis of communication quality information received by the relay device from each of the plurality of communication terminals, wherein
a transmission power of a relay signal for the communication terminal is set by the relay device so that a difference between the transmission power and a propagation loss of the relay signal is below a predetermined value.

9. A base station, comprising:
an antenna; and
a circuit configured to control the antenna communicate with a communication terminal via a relay device when the communication terminal is selected by the relay device as the communication terminal to be relayed from among a plurality of communication terminals on the basis of communication quality information received by the relay device from each of the plurality of communication terminals, wherein
a transmission power of a relay signal corresponding to the communication terminal is set so that a difference between the transmission power and a propagation loss of the relay signal is below a predetermined value.

10. The relay device according to claim 7, wherein the circuit is further configured to:
estimate a distance between the relay device and the communication terminal on the basis of a propagation loss of a reference signal received from the communication terminal, the reference signal having known transmission power; and
estimate a propagation loss of the relay signal on the basis of the estimated distance.

11. The relay device according to claim 10, wherein the circuit is further configured to select a communication terminal with bad communication quality from among the plurality of communication terminals.

12. The communication terminal according to claim 8, wherein:
a distance between the relay device and the communication terminal is estimated by the relay device on the basis of a propagation loss of a reference signal received from the communication terminal, the reference signal having known transmission power, and
a propagation loss of the relay signal is estimated by the relay device on the basis of the estimated distance.

13. The communication terminal according to claim 12, wherein the relay device selects a communication terminal with bad communication quality from among the plurality of communication terminals.

14. The base station according to claim 9, wherein the relay device is further configured to:
estimate a distance between the relay device and the communication terminal is on the basis of a propagation loss of a reference signal received from the communication terminal, the reference signal having known transmission power, and
estimate a propagation loss of the relay signal on the basis of the estimated distance.

15. The base station according to claim 14, wherein the relay device is further configured to select a communication terminal with bad communication quality from among the plurality of communication terminals.

16. The communication system according to claim 6, wherein the circuit is further configured to select a communication terminal with bad communication quality from among the plurality of communication terminals.

17. The communication system according to claim 16, wherein the circuit is further configured to transmit the relay signal for the communication terminal to be relayed through beam forming.

18. The relay device according to claim 11, wherein the circuit is further configured to transmit the relay signal for the communication terminal to be relayed through beam forming.

19. The communication terminal according to claim 13, wherein the relay device transmits the relay signal for the communication terminal to be relayed through beam forming.

20. The base station according to claim 15, wherein the relay device is further configured to transmit the relay signal for the communication terminal to be relayed through beam forming.

* * * * *